United States Patent
Igarashi et al.

(10) Patent No.: US 7,736,814 B2
(45) Date of Patent: Jun. 15, 2010

(54) FUEL-CELL SYSTEM AND METHOD OF ESTIMATING NITROGEN CONCENTRATION ON FUEL ELECTRODE OF FUEL CELL

(75) Inventors: Fusaki Igarashi, Toyota (JP); Hiroaki Mori, Kasugai (JP)

(73) Assignee: Toyota Jidosha Kabushiki Kaihsa, Toyota-shi (JP)

( * ) Notice: Subject to any disclaimer, the term of this patent is extended or adjusted under 35 U.S.C. 154(b) by 52 days.

(21) Appl. No.: 11/920,702

(22) PCT Filed: Jul. 27, 2006

(86) PCT No.: PCT/JP2006/315360

§ 371 (c)(1),
(2), (4) Date: Nov. 19, 2007

(87) PCT Pub. No.: WO2007/018106

PCT Pub. Date: Feb. 15, 2007

(65) Prior Publication Data

US 2009/0104502 A1   Apr. 23, 2009

(30) Foreign Application Priority Data

Aug. 9, 2005 (JP) ............................. 2005-231349

(51) Int. Cl.
*H01M 8/12* (2006.01)
(52) U.S. Cl. ...................... 429/429; 429/428
(58) Field of Classification Search .................. 429/22, 429/24, 25, 34
See application file for complete search history.

(56) References Cited

U.S. PATENT DOCUMENTS

| | | | |
|---|---|---|---|
| 2003/0157383 A1 * | 8/2003 | Takahashi | 429/22 |
| 2005/0100768 A1 * | 5/2005 | Ueda et al. | 429/22 |
| 2006/0008689 A1 * | 1/2006 | Yonekura et al. | 429/25 |
| 2006/0051635 A1 * | 3/2006 | Kamihara | 429/25 |
| 2006/0110640 A1 * | 5/2006 | Yoshida et al. | 429/25 |
| 2006/0121326 A1 * | 6/2006 | Hiramatsu et al. | 429/25 |
| 2007/0243437 A1 * | 10/2007 | Katano | 429/25 |

FOREIGN PATENT DOCUMENTS

| | | | |
|---|---|---|---|
| JP | 2003-317752 A | | 11/2003 |
| JP | 2004-172026 A | | 6/2004 |
| JP | 2004342386 A | * | 12/2004 |
| JP | 2005-32652 A | | 2/2005 |
| JP | 2005-063712 A | | 3/2005 |
| JP | 2005-203143 A | | 7/2005 |
| JP | 2005-327596 A | | 11/2005 |
| JP | 2006-209996 A | | 8/2006 |

OTHER PUBLICATIONS

I.H. Musselman, L. Li, L. Washmon, D. Varadarajan, S.J. Riley, M. Hmyene, J.P. Ferraris, K.J. Balkus, Jr. Poly(3-dodecylthiophene) membranes for gas separation, J. Membr. Sci. 1999, 152, 1-18.*

* cited by examiner

*Primary Examiner*—Jennifer K Michener
*Assistant Examiner*—Carlos Barcena
(74) *Attorney, Agent, or Firm*—Kenyon & Kenyon LLP

(57) ABSTRACT

Nitrogen concentration in a fuel-cell stack is estimated more accurately, hence the life of the fuel-cell is prevented from being reduced by operation performed when the impurity concentration in the anode increases. The fuel-cell system comprises: stack temperature detection means for detecting the temperature of the fuel-cell stack; fuel electrode pressure detection means for detecting the pressure of the fuel electrode; and standing time measuring means for measuring the standing time. The fuel electrode nitrogen concentration, which indicates concentration of nitrogen in the fuel electrode of the fuel cell (nitrogen or the like transmitted from the air electrode to the fuel electrode via an electrolyte membrane), is estimated on the basis of the temperature of the fuel-cell stack at the time when operation of the fuel cell is stopped, the pressure in the fuel electrode at the time when the operation of the fuel cell is restarted, and the standing time between when the operation of the fuel cell is stopped and when the operation of the fuel cell is restarted.

10 Claims, 3 Drawing Sheets

FUEL-CELL SYSTEM AND METHOD OF ESTIMATING NITROGEN CONCENTRATION ON FUEL ELECTRODE OF FUEL CELL

This is a 371 national phase application of PCT/JP2006/315360 filed 27 Jul. 2006, claiming priority to Japanese Patent Application No. 2005-231349 filed 09 Aug. 2005, the contents of which are incorporated herein by reference.

BACKGROUND OF THE INVENTION

1. Field of the Invention

The present invention relates to a fuel-cell system and a method of estimating the nitrogen concentration on a fuel electrode of a fuel cell. More specifically, the present invention relates to the improvement of a technology for measuring or estimating the concentration of nitrogen present in a fuel electrode (anode) (also referred to as "anode nitrogen concentration" in the present specification) by transmitting nitrogen from an air electrode (cathode) to the fuel electrode through an electrolyte membrane.

2. Description of Related Art

One of the problems of a fuel-cell system is how to prevent reduction of the life of the fuel-cell system caused by an operation performed when the impurity concentration in the fuel electrode (anode) increases.

As a technology for solving such a problem, there has conventionally been a technology of obtaining the difference between a stack temperature and an ambient temperature when the operation of the fuel cell is stopped, and the difference between the stack temperature and the ambient temperature when the operation of the fuel cell is started, estimating the amount of time that has elapsed since the operation of the fuel cell has been stopped, as well as the concentration of nitrogen that has been transmitted from an air electrode (cathode) to anode via an electrolyte membrane, on the basis of temperature ratio (temperature difference when the operation of the fuel cell is started/temperature difference when the operation of the fuel cell is stopped), and limiting an output of a fuel-cell stack in accordance with the nitrogen concentration (see Japanese Patent Application Laid-Open No. 2004-172026, for example). This technology is capable of preventing the occurrence of excessive power generation in a state in which the impurity concentration in the anode is high.

SUMMARY OF THE INVENTION

However, even if the nitrogen concentration is estimated to limit the output of the fuel-cell stack as described above, in some cases it is difficult to accurately estimate the nitrogen concentration on the basis of the temperature ratio (temperature difference when the operation of the fuel cell is started/temperature difference when the operation of the fuel cell is stopped) as in the operation control method described above. In such an estimation method, if the nitrogen concentration is estimated to be higher than a true value (actual value of the nitrogen concentration), the output of the fuel-cell stack is limited excessively, and if, on the other hand, the nitrogen concentration is estimated to be lower than the true value, the output of the stack is allowed to be at least a rated output, causing power generation failure because of insufficient hydrogen, and eventually causing reduction of the life of the fuel cell. Therefore, a technology capable of estimating the anode nitrogen concentration more accurately is desired.

An object of the present invention is to provide a fuel-cell system, which is capable of accurately estimating the nitrogen concentration in a fuel-cell stack, and thereby preventing the life of the fuel-cell system from being reduced by the operation performed when the impurity concentration in the anode increases, and to provide a method of estimating the nitrogen concentration on the fuel electrode of the fuel cell.

The inventors of the present invention have investigated the contents of the conventional technology described above. For example, in the case of the above technique, the nitrogen concentration is estimated based on only the temperature ratio (temperature difference when the operation of the fuel cell is started/temperature difference when the operation of the fuel cell is stopped), but not only the temperature ratio but also the stack temperature, pressure in a fuel electrode (also referred to as "anode pressure" in the present specification), pressure in an air electrode (also referred to as "cathode pressure" in the present specification), a standing time (i.e., a time period between when the operation of the fuel cell is stopped and when the operation of the fuel cell is started), cross leakage, deterioration of an electrolyte membrane, and the like are considered as the influencing factors on the nitrogen concentration in an actual fuel-cell system. Further, as a result of repeated investigations, the inventors have reached a finding that a more accurate estimated value or an estimated value proximate to a true value can be obtained by estimating the nitrogen concentration on the fuel electrode when the operation of the fuel cell is started, on the basis of the stack temperature, anode pressure (pressure in the fuel electrode), and the time period in which the fuel cell is left standing.

The fuel-cell system of the present invention is based on the above finding, and is to estimate fuel electrode nitrogen concentration, which indicates concentration of nitrogen in a fuel electrode of a fuel cell, on the basis of the temperature of a fuel-cell stack at the time when operation of the fuel cell is stopped, pressure in the fuel electrode at the time when the operation of the fuel cell is restarted, and a standing time between when the operation of the fuel cell is stopped and when the operation of the fuel cell is restarted. Moreover, in the method of estimating the fuel electrode nitrogen concentration in the fuel cell according to the present invention, the fuel electrode nitrogen concentration, which indicates concentration of nitrogen in the fuel electrode of the fuel cell, is estimated on the basis of the temperature of the fuel-cell stack at the time when operation of the fuel cell is stopped, pressure in the fuel electrode at the time when the operation of the fuel cell is restarted, and the standing time between when the operation of the fuel cell is stopped and when the operation of the fuel cell is restarted.

In such a fuel-cell system and a method of estimating fuel electrode concentration in a fuel cell, when estimating the nitrogen concentration in the fuel electrode, a value proximate to a true value (actual value of the nitrogen concentration) can be obtained by performing estimation in consideration of and based on stack temperature, pressure in the fuel electrode (anode pressure), and a standing time which are the influencing factors on the nitrogen concentration in an actual fuel-cell system. Therefore, the fuel-cell system and the estimation method of the present invention can prevent the occurrence of the problems that an output of the fuel-cell stack is limited excessively, causing deterioration of acceleration performance, or that an output of the stack is allowed to be at least the ability thereof, causing power generation failure. The fuel-cell system and the estimation method of the present invention can further prevent reduction of the life of the fuel-cell system.

Furthermore, the fuel-cell system according to the present invention has stack temperature detection means for detecting temperature of a fuel-cell stack, fuel electrode pressure detection means for detecting pressure of the fuel electrode, and standing time measuring means for measuring the standing time. According to this fuel-cell system, the fuel electrode nitrogen concentration can be estimated more accurately by using the stack temperature detection means for detecting temperature of a fuel-cell stack, the fuel electrode pressure detection means for detecting pressure of the fuel electrode, and the standing time measuring means for measuring the standing time.

In this case, it is preferred that the fuel electrode nitrogen concentration be estimated on the basis of the temperature of the fuel-cell stack at the time when the operation of the fuel-cell is stopped, and on the basis of a map illustrating the relation between a standing time in which the fuel-cell stack is left standing and the pressure of the fuel electrode when the temperature of the fuel-cell stack is the above-mentioned temperature. Accordingly, the fuel electrode nitrogen concentration can be estimated more accurately.

As the map, a first map, which illustrates the relation when the fuel electrode nitrogen concentration is in a first concentration state, and a second map, which illustrates the relation when the fuel electrode nitrogen concentration is in a state in which the concentration is higher than that in the first concentration state. When the standing time is shorter than a time period in which the pressure in the fuel electrode reaches a minimum value, it is preferred that the first map be used to estimate the fuel electrode nitrogen concentration. When, on the other hand, the standing time is longer than the time period in which the pressure in the fuel electrode reaches the minimum value, it is preferred that the second map be used to estimate the fuel electrode nitrogen concentration. According to this fuel-cell system, the first map and the second map are applied separately in accordance with the amount (length) of the standing time, the first map illustrating the relation when the fuel electrode nitrogen concentration is in a low concentration state, and the second map illustrating the relation when the fuel electrode nitrogen concentration is in a high concentration state. Therefore, the fuel electrode nitrogen concentration can be estimated more accurately.

The fuel-cell system according to the present invention further has judging means for judging whether or not a time period measured by the standing time measuring means is cleared, wherein when it is judged that the measured time period is cleared, the fuel electrode nitrogen concentration is taken as a maximum value in the map. Accordingly, a value smaller than the true value of the anode nitrogen concentration can be estimated, and power generation failure which is caused by insufficient hydrogen can be prevented from occurring.

Moreover, the fuel-cell system according to the present invention further has storage means for storing the fuel electrode nitrogen concentration at the time when the operation of the fuel cell is stopped, wherein, out of a stored value of the fuel electrode nitrogen concentration at the time when the operation is stopped, and the estimated value of the fuel electrode nitrogen concentration at the time when the operation is restarted, a larger value is employed. For example, when the fuel cell is stopped when the anode nitrogen concentration is high, and is then restarted immediately thereafter, a value lower than the true value is estimated although the anode nitrogen concentration is not low enough, and consequently power generation failure may occur because of insufficient hydrogen. However, the present invention can prevent such situation.

DETAILED DESCRIPTION OF PREFERRED EMBODIMENT

Hereinafter, the configuration of the present invention is described in detail with reference to an embodiment shown in the figures.

Figure 1:
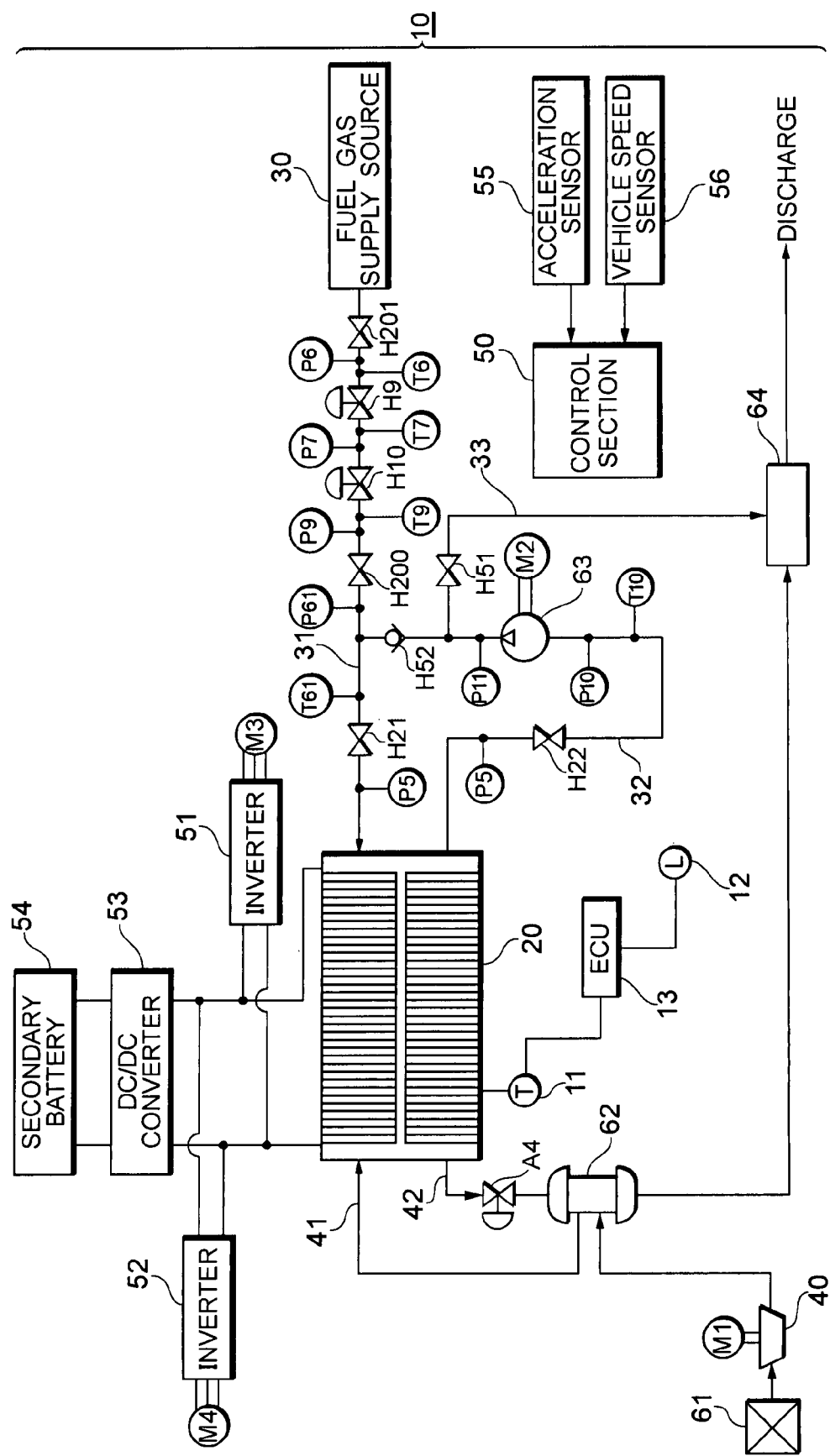
FIG. 1 is a block diagram of a fuel-cell system of the present invention, which shows an embodiment of the fuel-cell system.
Figure 2:
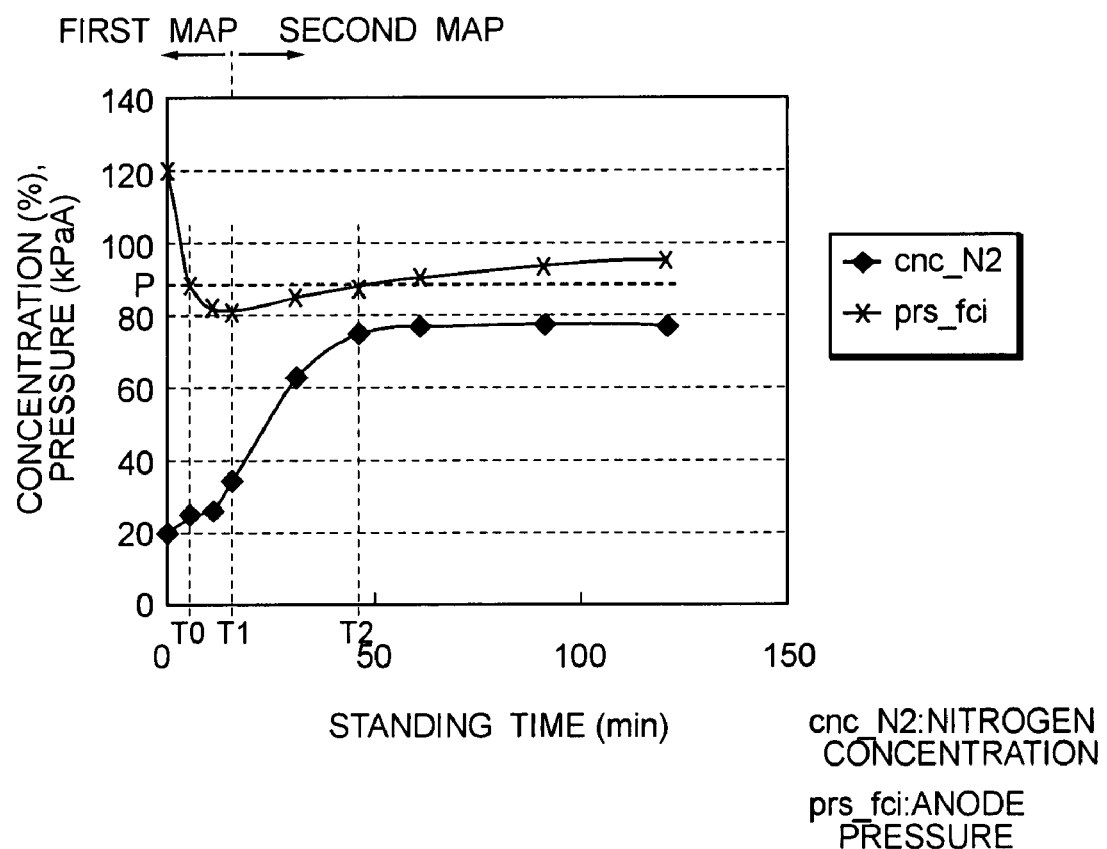
FIG. 2 is a map, which illustrates fluctuations of the anode pressure and anode nitrogen concentration with respect to a standing time in a case in which the stack temperature is 65° C. when operation of the fuel cell is stopped.
Figure 3:
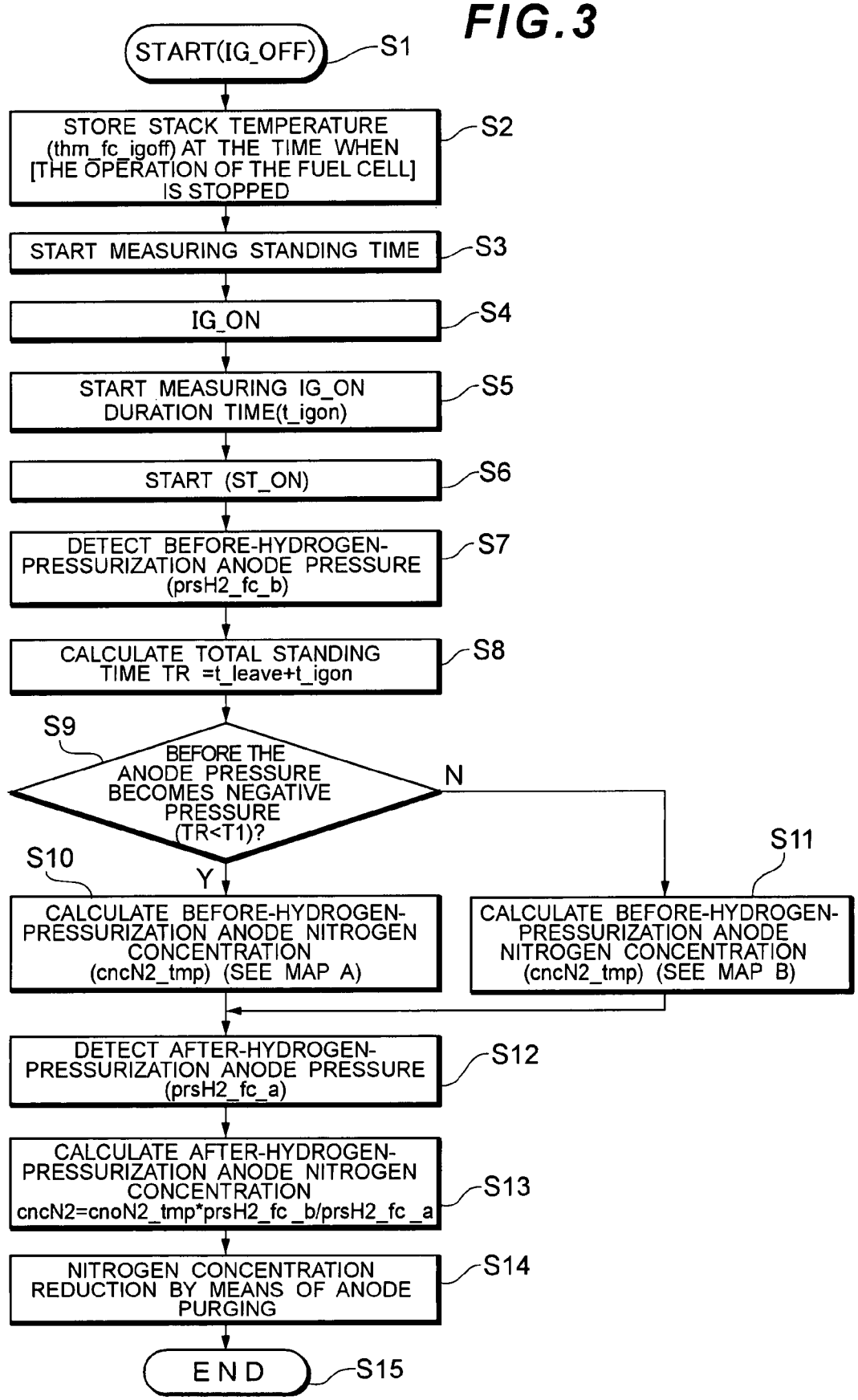
FIG. 3 is a chart showing a flow of estimation of the anode nitrogen concentration in the present embodiment.

FIG. 1 through FIG. 3 show an embodiment of the present invention. In a fuel-cell system 10 according to the present invention, fuel electrode nitrogen concentration, which indicates concentration of nitrogen in a fuel electrode of a fuel-cell stack 20 (e.g. nitrogen which is transmitted from a cathode (air electrode) to an anode (fuel electrode) through an electrolyte membrane), is estimated based on the temperature of the fuel-cell stack 20 at the time when the operation of the fuel cell is stopped, the pressure of the anode at the time when the operation of the fuel cell is restarted, and a standing time between when the operation of the fuel cell is stopped and when the operation of the fuel cell is restarted. Hereinafter, the entire overview of the fuel-cell system 10 is described first, and then a configuration for estimating the fuel electrode nitrogen concentration is described.

Next, the configuration of the fuel-cell system 10 of the present embodiment is described. It should be noted that the fuel cell is sometimes expressed as "FC" hereinafter. FIG. 1 shows a schematic configuration of the fuel-cell system 10 according to the present embodiment. Here, described is an example in which the fuel-cell system 10 is used an on-board power generating system for a fuel-cell hybrid vehicle (FCHV), but it goes without saying that the fuel-cell system 10 can be used as a power generating system or the like mounted in various movable bodies (e.g. a ship, aircraft, etc.). The fuel-cell cell stack (also referred to as "fuel-cell stack" or simply "stack" hereinafter) 20 has a stack structure having a plurality of single cells stacked in series, and is constituted by, for example, a solid polymer electrolyte fuel cell and the like.

Further, the fuel-cell system 10 of the present embodiment has a fuel gas circulation supply system and oxide gas supply system, which are connected to the fuel-cell stack 20. The fuel gas circulation supply system of the fuel-cell stack 20 comprises a fuel gas supply source 30, a fuel gas supply path 31, the fuel-cell stack 20, a fuel gas circulation path 32, and an anode off-gas flow path 33 (see FIG. 1).

The fuel gas supply source 30 is constituted by a hydrogen storage source such as, for example, a high-pressure hydrogen tank, a hydrogen storage tank, or the like. The fuel gas supply path 31 is a gas flow path for guiding fuel gas, which is emitted from the fuel gas supply source 30, to the anode (fuel electrode) of the fuel-cell stack 20, and has disposed therein a tank valve H201, a high pressure regulator H9, a low pressure regulator H10, a hydrogen supply valve H200, and a FC inlet valve H21 from an upstream to a downstream of the gas flow path. The fuel gas compressed to high pressure is subjected to pressure reduction by the high pressure regulator H9 to have medium pressure, and is further subjected to pressure reduction by the low pressure regulator H10 to have low pressure (normal operating pressure).

The fuel gas circulation path 32 is a return gas flow path for causing unconverted fuel gas to flow back to the fuel-cell stack 20, and has disposed therein a FC outlet valve H22, a hydrogen pump 63, and a check valve H52 from an upstream to a downstream of the gas flow path. Low-pressure unconverted fuel gas, which is discharged from the fuel-cell stack 20, is pressurized appropriately by the hydrogen pump 63 and guided to the fuel gas supply path 31. The check valve H52 prevents the fuel gas from flowing back to the fuel gas circulation path 32 from the fuel gas supply path 31. Moreover, the anode off-gas flow path 33, which is divided in the middle of the fuel gas circulation path 32, is a gas flow path for discharging hydrogen off-gas discharged from the fuel-cell stack 20, to the outside of the system, and has disposed therein a purge valve H51.

It should be noted that the tank valve H201, hydrogen supply valve H200, FC inlet valve H21, FC outlet valve H22, and purge valve H51 supplies the fuel gas to each of the gas flow paths 31 through 33 or to the fuel-cell stack 20, or are shut-off valves for shutting off a flow of the fuel gas, and constituted by, for example, an electromagnetic valve. As such an electromagnetic valve, for example, an on-off valve or a linear valve which can linearly adjust the degree of valve opening by means of PWM control is suitable.

The oxide gas supply system of the fuel-cell stack 20 comprises an air compressor (oxide gas supply source) 40, an oxide gas flow path 41, and a cathode off-gas flow path 42. It should be noted that the air compressor 40 compresses the air taken in from the atmosphere via an air filter 61, and supplies the compressed air as oxide gas to the cathode (air electrode) of the fuel-cell stack 20. The oxygen off-gas, which is obtained after contributing to a cell reaction of the fuel-cell stack 20, flows the cathode off-gas flow path 42 and is discharged to the outside of the system. This oxygen flow-gas contains moisture generated by the cell reaction of the fuel-cell stack 20, and thus is in a high humidity state. A humidifying module 62 exchanges the moisture between the oxide gas, which flows the oxide gas flow path 41 and is in a low humidity state, and the oxygen off-gas which flow the cathode off-gas flow path 42 and is in a high humidity state, and appropriately humidifies the oxide gas supplied to the fuel-cell stack 20. The back pressure of the oxide gas supplied by the fuel-cell stack 20 is adjusted by a pressure-regulating valve A4 disposed in the vicinity of a cathode outlet of the cathode off-gas flow path 42. The cathode off-gas flow path 42 is communicated to a diluter 64 at the downstream of the cathode off-gas flow path 42. Furthermore, the anode off-gas flow path 33 is communicated to the diluter 64 at the downstream of the anode off-gas flow path 33 so that the hydrogen off-gas is mixed and diluted and mixed with the oxide gas and thereafter discharged to the outside of the system.

A part of direct-current power generated in the fuel-cell stack 20 is subjected to pressure reduction by a DC/DC converter 53, and charged to a battery (secondary battery) 54. A traction inverter 51 and an auxiliary inverter 52 converts the direct-current power supplied from both or one of the fuel-cell stack 20 and battery 54, to alternating-current power, and supplies the alternating-current power to a traction motor M3 and to an auxiliary motor M4. Incidentally, the auxiliary motor M4 collectively means a motor M2 driving the hydrogen circulation pump 63 described hereinafter and a motor M1 driving the air compressor 40, and thus may function as the motor M1 or as the motor M2. It should be noted that, hereinafter, the one driven by one of or both of the fuel-cell stack 20 and battery 54 is generally referred to as "load".

A control section 50 obtains system requiring power (sum of vehicle travel power and auxiliary power) on the basis of an acceleration opening detected by an acceleration sensor 55 and vehicle speed detected by a vehicle speed sensor 56, and controls the system such that the fuel-cell stack 20 corresponds to a target power. Specifically, the control section 50 adjusts the number of rotations of the motor M1 driving the air compressor 40 to adjust the amount of the oxide gas supplied, and at the same time adjusts the number of rotations of the motor M2 driving the hydrogen pump 63 to adjust the amount of the fuel gas supplied. Moreover, the control section 50 controls the DC/DC converter 53 to adjust an operation point (output voltage, output current) of the fuel-cell stack 20 so that output power of the fuel-cell stack 20 corresponds to the target power.

Pressure sensors (state detection means) P6, P7, P9, P61, P5, P10, P11 for detecting the pressure of the fuel gas and temperature sensors (state detection means) T6, T7, T9, T61, T5, T10 for detecting the temperature of the fuel gas are disposed in each of a high-pressure section (section between the tank valve H201 and the hydrogen supply valve H200), a low-pressure section (hydrogen supply valve H200 through FC inlet valve H21), a FC section (stack inlet valve H21 through FC outlet valve H22), and a circulation section (FC outlet valve H22 through check valve H52). To describe the role played by each pressure sensor in detail, the pressure sensor P6 detects fuel gas supply pressure of the fuel gas supply source 30. The pressure sensor P7 detects secondary pressure of the high-pressure regulator H9. The pressure sensor P9 detects secondary pressure of the low-pressure regulator H10. The pressure sensor P61 detects pressure of a low-pressure section of the fuel gas supply path 31. The pressure sensor P5 detects pressure of a stack inlet. The pressure sensor P10 detects pressure on an input port side (upstream side) of the hydrogen circulation pump 63. The pressure sensor P11 detects pressure on an outlet port side (downstream side) of the hydrogen circulation pump 63.

As described above, the anode nitrogen concentration in the fuel-cell stack 20 (including the concentration of nitrogen in the anode which is transmitted from the cathode to the anode through an electrolyte membrane in the fuel-cell stack 20) is estimated in the fuel-cell system 10 of the present embodiment, and, as an example for realizing this estimation, the fuel-cell system 10 comprises stack temperature detection means 11 for detecting stack temperature of a fuel cell, fuel electrode pressure detection means P5 for detecting pressure of the anode (fuel electrode), standing time measuring means 12 for measuring a standing time, and an ECU 13 (see FIG. 1). Hereinafter, the detail of the configuration for estimating the anode nitrogen concentration and a method of estimating the anode nitrogen concentration by means of this configuration are described (see FIG. 1 and the like). It should be noted that the anode nitrogen concentration tends to increase during a period in which gas is not flowing the anode, i.e. during a period in which operation of the fuel cell 10 is stopped. Therefore, it is preferred that outputs of the fuel-cell stack 20 be limited when the operation of the fuel cell 10 is started.

The stack temperature detection means 11 is means for detecting stack temperature of the fuel cell, i.e. temperature of the fuel-cell stack 20, and is constituted by a section for measuring the temperature and a section for transmitting information on the measured temperature. For example, the stack temperature detection means 11 of the present embodiment is provided so as to detect temperature of the fuel-cell stack 20 and transmit data related to the detected temperature to the ECU 13 (see FIG. 1).

The standing time measuring means 12 is means for measuring a time period in which the fuel-cell stack 20 is left standing, i.e. a time period between when operation of the fuel cell is stopped and when the operation of the fuel cell is restarted, and is constituted by, for example, a timer. The standing time measuring means 12 of the present embodiment is connected to the ECU 13 (see FIG. 1), and is provided so as to receive a command signal from the ECU 13 to start measuring a standing time, and further receive a command signal from the ECU 13 to end the measurement. It should be noted that the standing time measuring means 12 of the present embodiment can measure a time period between when an ignition switch is switched on for the stopped fuel-cell stack 20 and when operation of the fuel-cell stack 20 is started in the ignition ON state (ignition ON duration time).

The fuel electrode pressure detection means P5 is for detecting pressure in the fuel electrode (anode), and is constituted by, for example, a pressure gauge. In the present embodiment, the fuel electrode pressure detection means P5 is disposed in the low-pressure section of the fuel gas supply path 31, i.e. the section between the FC inlet valve H21 and the fuel-cell stack 20 (see FIG. 1). Furthermore, the fuel electrode pressure detection means P5 is connected to the ECU 13 so as to transmit data related to detected pressure to the ECU 13.

The ECU 13 is control means constituted by an electric control unit. The ECU 13 of the present embodiment is connected to the above-described stack temperature detection means 11, standing time measuring means 12, and fuel electrode pressure detection means P5, acquires the data related to stack temperature, standing time, and fuel electrode pressure (anode pressure), and estimates the anode nitrogen concentration (including the concentration of nitrogen transmitted from the cathode to the anode through an electrolyte membrane) on the basis of the acquired data. It should be noted that, although not shown particularly in detail in FIG. 1, the ECU 13 is also connected to the control section 50, and outputs of the fuel-cell stack 20 are limited when necessary in accordance with the estimated anode nitrogen concentration.

Moreover, in the present embodiment, there is prepared a map illustrating the relation between a standing time and anode pressure at the time when the operation of the fuel cell is stopped, and the anode nitrogen concentration is estimated based on this map. Specifically, there is prepared actual machine data, as shown in FIG. 2, i.e. a map illustrating fluctuations of the anode pressure and anode nitrogen concentration with respect to a standing time in a case in which the stack temperature is 65° C. when operation of the fuel cell is stopped, and the anode nitrogen concentration is estimated based on this map. Incidentally, ♦ (black diamond-shaped mark) indicates anode nitrogen concentration (cnc_N2, the unit is %), and x indicates anode pressure (prs_fci, the unit is kPaA). As shown in the figure, a value of the anode pressure indicated by x (prs_fci) shows a change such that the value decreases drastically once when operation of the fuel cell is stopped, and gradually increases after reaching the minimum value, i.e. the peak of negative pressure at elapsed time T1 (approximately over 80 kPaA in the case of the actual machine data shown in FIG. 2) (it should be noted that the negative pressure here is based on atmosphere pressure). On the other hand, the anode nitrogen concentration indicated by ♦ (cnc_N2) shows a change such that the anode nitrogen concentration continues to increase halfway, and thereafter converges smoothly.

Here, for example, on the basis of certain pressure p (see FIG. 2), in the standing time corresponding to pressure p, there two types of time periods, T0 and T2 (i.e. two types of different standing times) as shown clearly in the figure. In this case, when the anode nitrogen concentration (cnc_N2) at the time (T0 in FIG. 2) before the time T1 at which the anode pressure reaches the peak of negative pressure is taken as an estimated value, since this value is in the middle of increasing and is still a small value, an error may be generated, and appropriate control is not performed. In this case, as a means for preventing the occurrence of such an error, it is possible to take means for taking, as an estimated value, the anode nitrogen concentration (cnc_N2) at the time point after the time T1 (elapsed time T2 in the present embodiment) at which the anode pressure reaches the minimum value (peak of the negative pressure), but the present embodiment take means which is different from the above-mentioned means. Specifically, in the case of the present embodiment in which a standing time is also measured, it is judged easily whether the standing time, which is measured by the standing time measuring means 12, is before the time T1 (time at which the anode pressure reaches the peak of the negative pressure) or after T1, according to the map constituted by the actual machine data (FIG. 2). Consequently, the estimated value of the anode nitrogen concentration is obtained after performing such judgment. In this case, since the estimated value is not obtained in a state before T1, that is, the estimated value is not obtained when the anode nitrogen concentration is in a so-called low nitrogen concentration state in which the anode nitrogen concentration does not yet increase sufficiently, an error is not generated. For example, if the anode nitrogen concentration is taken as the estimated value before the anode nitrogen concentration increases sufficiently, unnecessary output limit is imposed on the fuel cell, but in the case of the present embodiment in which accurate estimation of the anode nitrogen concentration is performed as described above, such unnecessary output limit is not imposed. Therefore, estimation of an erroneous anode nitrogen concentration is prevented from occurring when the fuel cell is left standing for a short period of time and thereafter operation thereof is restarted, the outputs of the fuel-cell stack can be limited more appropriately, and deterioration of the acceleration performance, which is caused after leaving the fuel cell for a short period of time, can be improved.

Next, a flow of estimation of the anode nitrogen concentration in the present embodiment is described hereinafter with reference to a chart (see FIG. 3).

First of all, the flow of estimating the anode nitrogen concentration in the present embodiment is started by stopping the operation of the fuel cell by turning the ignition off (IG_OFF) (step 1). When the fuel cell is stopped, the temperature of the fuel-cell stack (thm_fc_igoff) at the time point when the fuel cell is stopped is detected by the stack temperature detection means 11, and the detected temperature is stored in the ECU 13 (step 2). Further, measurement of a standing time (t_leave) is started (step 3). When the ignition switch is turned on, (state of IG_ON indicated as a step 4), IG_ON measurement time (t_igon) and the time until which the ignition switch is turned on and the fuel-cell stack 20 is started is measured (step 5).

Next, when the stopped fuel cell is restarted (ST_ON indicated in a step 6), anode pressure (prsH2_fc_b) before hydrogen pressurization is detected (step 7). Consequently, the total standing time TR, i.e. the total time period of the abovementioned "standing time (t_leave)" and "IG_ON duration time (t_igon)" is calculated (TR=t_leave+t_igon) (step 8).

Then, on the basis of a result of calculation, it is determined whether the total standing time TR is longer or shorter than the standing time T1, that is, whether the timing at which the fuel-cell stack 20 is restarted is before or after the time when the anode pressure reaches the peak of the negative pressure. In other words, the size of the total standing time TR and of the standing time T1 is determined (step 9), and if the time period T1 is larger than the total standing time TR (TR<T1), it is determined that the fuel cell is started before the anode pressure reaches the peak of the negative pressure, and the process proceeds to a step 10. In this step 10, a map illustrating the anode nitrogen concentration before hydrogen pressurization is referenced to calculate the anode nitrogen concentration (cncN2_tmp) before hydrogen pressurization (step 10).

It should be noted that the map to be referenced here can be, for example, the map constituted by the actual machine data itself (see FIG. 2), but it is preferred that the map be divided beforehand into the first map which is applied in a first nitrogen state (low nitrogen concentration state, for example), and a second map which is applied in the case of a second nitrogen state in which the concentration is higher than first nitrogen state. For example, in the present embodiment, the map is divided into a before-hydrogen-pressurization anode nitrogen concentration map A (the curve in FIG. 2 from time t=0 through t=T1) as the first map, which shows a low nitrogen concentration state, and a before-hydrogen-pressurization anode nitrogen concentration map B (the curve in FIG. 2 from t=T1 and onward) as the second map, which shows a high nitrogen concentration state in which the concentration is higher than the low nitrogen concentration state. Therefore, in the case where TR<T1 as described above, the fuel-cell stack 20 is restarted before the anode pressure reaches the peak of the negative pressure, thus the anode nitrogen concentration is calculated with reference to the map A showing the low nitrogen concentration state (step 10). Once the anode nitrogen concentration before hydrogen pressurization (cncN2_tmp) is calculated, the process proceeds to a step 12.

On the other hand, as a result of determination on the size of the total standing time TR and of the standing time T1 in the step 9, if the opposite result is obtained, i.e. if the standing time T1 is smaller than the total standing time TR (TR>T1), it is determined that the fuel cell is restarted after the anode pressure reaches the peak of the negative pressure, and thereby the process proceeds to a step 11. In the step 11, calculation of the anode nitrogen concentration before hydrogen pressurization (cncN2_tmp) is performed in the same manner as in the step 10, but in the step 11 the map B is referenced instead of the map A. Once the anode nitrogen concentration before hydrogen pressurization (cncN2_tmp) is calculated, the process proceeds to a step 12.

Next, in the step 12, anode pressure after hydrogen pressurization (prsH2_fc_a) is detected (step 12). Thereafter, the anode nitrogen concentration after hydrogen pressurization (cncN2) is calculated (step 13). As shown in FIG. 3, the anode nitrogen concentration after hydrogen pressurization (cncN2) can be obtained by an equation, $$cncN2 = cncN2\_tmp * prsH2\_fc\_b / prsH2\_fc\_a$$

In other words, the anode nitrogen concentration after hydrogen pressurization can be obtained as a value by multiplying the anode nitrogen concentration before hydrogen pressurization (cncN2_tmp) by the anode pressure before hydrogen pressurization (prsH2_fc_b), and dividing thus obtained result by the anode pressure after hydrogen pressurization (prsH2_fc_a). Accordingly, subtraction of nitrogen concentration is performed by means of anode purging (step 14), and consequently a series of processing is ended (step 15). Thereafter, output limit is performed appropriately on the fuel-cell stack 20 on the basis of a result of estimation of the anode nitrogen concentration (or a calculation result) obtained in the manner described above, and accordingly the occurrence of excessive power generation in a state in which the impurity concentration in the anode is high can be prevented.

Furthermore, in the case in which the anode nitrogen concentration is estimated as described above, it is preferred to adopt a technique of setting the anode nitrogen concentration as a maximum value when a time period measured by the standing time measuring means is cleared during measurement of a time. During time measurement performed by the standing time measuring means 12, if the time periods measured previously are reset and cleared to 0 for some reasons (for example, when the auxiliary battery is detached), the standing time obtained by the standing time measuring means 12 becomes shorter than the original value, and as a result, a value, which is lower than the true value of the anode nitrogen concentration that should be estimated originally, might be estimated, causing power generation failure because of insufficient hydrogen. On the other hand, if the anode nitrogen concentration is taken as the maximum value in the above case, at least power generation failure, which is caused by insufficient hydrogen as described above, can be prevented from occurring. As the value taken as the maximum in this case can be various values, but in the present embodiment, the value is approximately below 80% at which the value of the anode nitrogen concentration converges to be the maximum value. Furthermore, the ECU 13, for example, can detect or judge that the standing time measuring means 12 is reset although the fuel-cell stack 20 is left standing.

Moreover, preferably there is provided the means for storing the anode nitrogen concentration at the time when the operation of the fuel cell is stopped, and, out of the anode nitrogen concentration at the time when the operation is stopped, and the anode nitrogen concentration (estimated value) at the time when the operation is started next (restarted), a larger value is employed. For example, when the fuel cell is stopped when the anode nitrogen concentration is high, and is then restarted immediately thereafter, a value lower than the true value is estimated although the anode nitrogen concentration is not low enough, and consequently power generation failure may occur because of insufficient hydrogen as in the above case. On the other hand, by storing the anode nitrogen concentration at the time when the operation is stopped, comparing the stored value with the estimated value, and selecting/adopting a higher value, at least power generation failure, which is caused by insufficient hydrogen as described above, can be prevented from occurring. In the present embodiment, the anode nitrogen concentration at the time when the operation is stopped is stored by the ECU 13, and, when necessary, the stored value is compared with the estimated value.

As described above, in the fuel-cell system of the present embodiment, the anode nitrogen concentration (fuel electrode nitrogen concentration) in the fuel-cell stack 20 is estimated more accurately, and thereby, compared to the prior art, the life of the fuel-cell stack can be prevented from being reducing by operation performed when the impurity concentration of the anode increases.

It should be noted that the above-described embodiment is merely a suitable example of the present invention, and is not limited to this suitable example and can be modified and implemented in various ways without departing from the scope of the present invention. For example, in the present embodiment the anode nitrogen concentration is estimated based on the map of the anode pressure (pressure in the fuel electrode of the fuel-cell stack 20) as described above, but the anode nitrogen concentration can be estimated based on other elements. For example, the anode nitrogen concentration can be determined based on the rate of change of the anode pressure (for example, the gradient associated with pressure increase or the gradient associated with pressure decrease). Specifically, in the characteristics of the change of pressure at the time when the operation is stopped, the characteristics being shown in the map of FIG. 2, a tendency in which the pressure gradient decreases is shown before t=T1, while a tendency in which the pressure gradient increases is shown after t=T1. Accordingly, the map can be switched when the pressure gradient fluctuates from a decreasing state to an increasing state, and thereby the nitrogen concentration can be estimated.

INDUSTRIAL APPLICABILITY

Moreover, the map shown in the present embodiment merely shows an example of a case in which the stack temperature is 65° C. when operation of the fuel cell is stopped, thus it goes without saying that, if the fuel cell itself or the fuel-cell system is different, a map showing different stack temperature should be used in accordance with the fuel cell or the fuel-cell system.

According to the present invention, the nitrogen concentration in the fuel-cell stack is estimated more accurately, and thereby the life of the fuel-cell system can be prevented from being reduced by operation performed when the impurity concentration of the anode increases.

Therefore, the present invention can be used widely in a fuel-cell system having such request.

We claim:

1. A fuel-cell system, wherein fuel electrode nitrogen concentration, which indicates concentration of nitrogen in a fuel electrode of a fuel cell, is estimated on the basis of temperature of a fuel-cell stack at the time when operation of the fuel cell is stopped, pressures in the fuel electrode before and after hydrogen pressurization at the time when the operation of the fuel cell is restarted, and a standing time between when the operation of the fuel cell is stopped and when the operation of the fuel cell is restarted, the system further comprising:
a first map which illustrates the relation when the fuel electrode nitrogen concentration is in a first low nitrogen concentration state,
a second map which illustrates the relation when the fuel electrode nitrogen concentration is in a second high nitrogen concentration state,
wherein when the standing time is shorter than a time period in which the pressure in the fuel electrode reaches a peak of negative pressure, the first map is used, but when, on the other hand, the standing time is longer than the time period in which the pressure in the fuel electrode reaches the peak of the negative pressure, the second map is used, and the estimated value of the fuel electrode nitrogen concentration is obtained after determining which map is used.

2. The fuel-cell system according to claim 1, comprising: a stack temperature detection device to detect the temperature of the fuel-cell stack; a fuel electrode pressure detection device to detect the pressure of the fuel electrode; and a standing time measuring device to measure the standing time.

3. The fuel-cell system according to claim 2, wherein the fuel electrode nitrogen concentration is estimated on the basis of the temperature of the fuel-cell stack at the time when the operation of the fuel-cell is stopped, and on the basis of a map illustrating the relation between a standing time in which the fuel-cell stack is left standing and the pressure of the fuel electrode when the temperature of the fuel-cell stack is the temperature when the operation of the fuel-cell is stopped.

4. The fuel-cell system according to claim 1, comprising a judging device to judge whether or not a time period measured by the standing time measuring device has cleared, wherein when it is judged that the measured time period has cleared, the fuel electrode nitrogen concentration is taken as a maximum value in the map.

5. The fuel-cell system according to claim 1, comprising a storage device to store the fuel electrode nitrogen concentration at the time when the operation of the fuel cell is stopped, wherein, out of a stored value of the fuel electrode nitrogen concentration at the time when the operation is stopped, and an estimated value of the fuel electrode nitrogen concentration at the time when the operation is restarted, the larger value is employed.

6. A method of estimating fuel electrode nitrogen concentration in a fuel cell, wherein fuel electrode nitrogen concentration, which indicates concentration of nitrogen in a fuel electrode of a fuel cell, is estimated on the basis of a temperature of a fuel-cell stack at the time when operation of the fuel cell is stopped, pressures in the fuel electrode before and after hydrogen pressurization at the time when the operation of the fuel cell is restarted, and a standing time between when the operation of the fuel cell is stopped and when the operation of the fuel cell is restarted, the method further comprising:
detecting a first pressure in the fuel electrode before the hydrogen pressurization at the time when the operation of the fuel cell is restarted;
detecting a second pressure in the fuel electrode after the hydrogen pressurization at the time when the operation of the fuel cell is restarted;
providing a first map which illustrates the relation when the fuel electrode nitrogen concentration is in a first low nitrogen concentration state;
providing a second map which illustrates the relation when the fuel electrode nitrogen concentration is in a second high nitrogen concentration state; and
estimating the fuel electrode nitrogen concentration utilizing the first and second maps, and the first and second detected pressures in the fuel electrode, wherein when the standing time is shorter than a time period in which the pressure in the fuel electrode reaches a peak of negative pressure, the first map is used, but when, on the other hand, the standing time is longer than the time period in which the pressure in the fuel electrode reaches the peak of the negative pressure, the second map is used, and the fuel electrode nitrogen concentration is estimated after determining which map is used.

7. The method according to claim 6, wherein the fuel-cell system comprises: a stack temperature detection device to detect the temperature of the fuel-cell stack; a fuel electrode pressure detection device to detect the pressure of the fuel electrode; and a standing time measuring device to measure the standing time.

8. The method according to claim 7, wherein the fuel electrode nitrogen concentration is estimated on the basis of the temperature of the fuel-cell stack at the time when the operation of the fuel-cell is stopped, and on the basis of a map illustrating the relation between a standing time in which the fuel-cell stack is left standing and the pressure of the fuel electrode when the temperature of the fuel-cell stack is the temperature when the operation of the fuel-cell is stopped.

9. The method according to claim 6, wherein the fuel-cell system comprises a judging device to judge whether or not a time period measured by the standing time measuring device has cleared, wherein when it is judged that the measured time period has cleared, the fuel electrode nitrogen concentration is taken as a maximum value in the map.

10. The method according to claim 6, wherein the fuel-cell system comprises a storage device to store the fuel electrode nitrogen concentration at the time when the operation of the fuel cell is stopped, wherein, out of a stored value of the fuel electrode nitrogen concentration at the time when the operation is stopped, and an estimated value of the fuel electrode nitrogen concentration at the time when the operation is restarted, the larger value is employed.

* * * * *